July 9, 1929.  R. W. NEWCOMB  1,720,231
TEMPERATURE CONTROLLING SYSTEM
Filed April 23, 1924
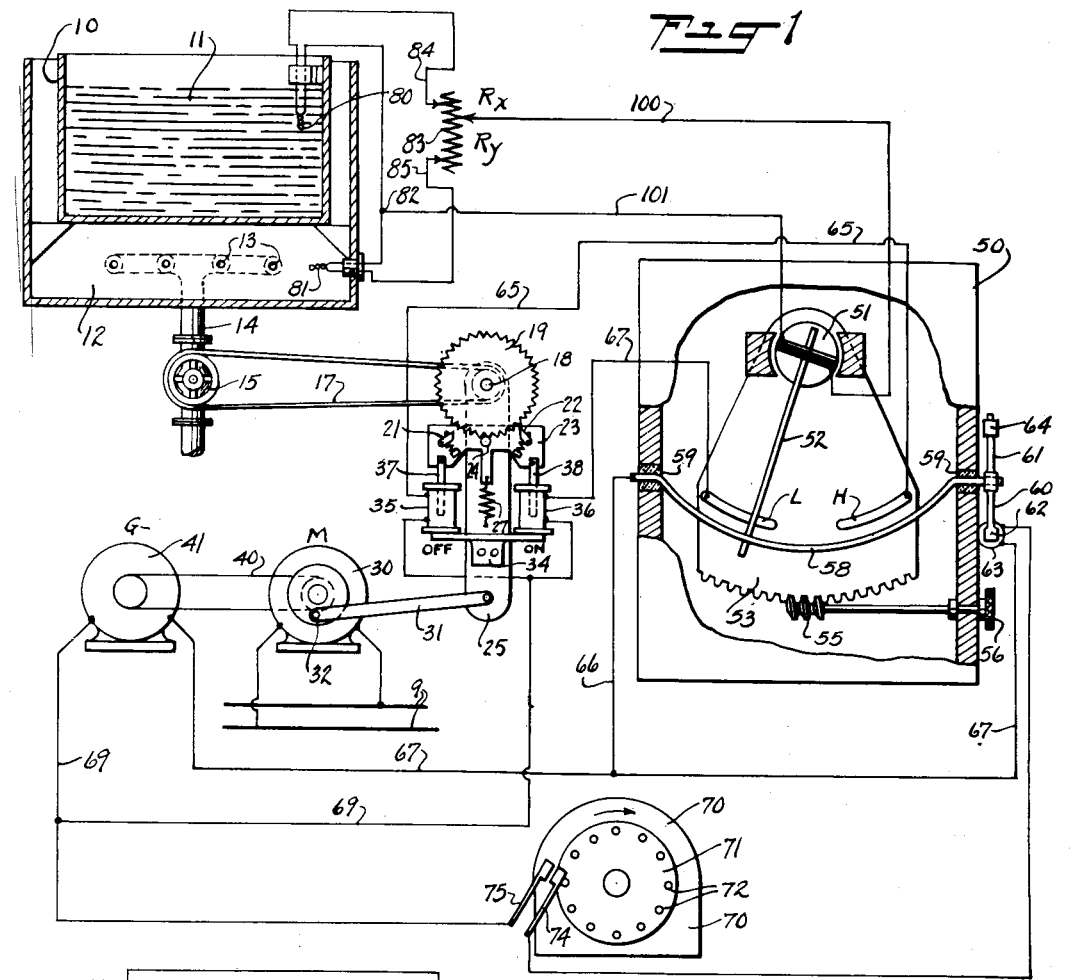
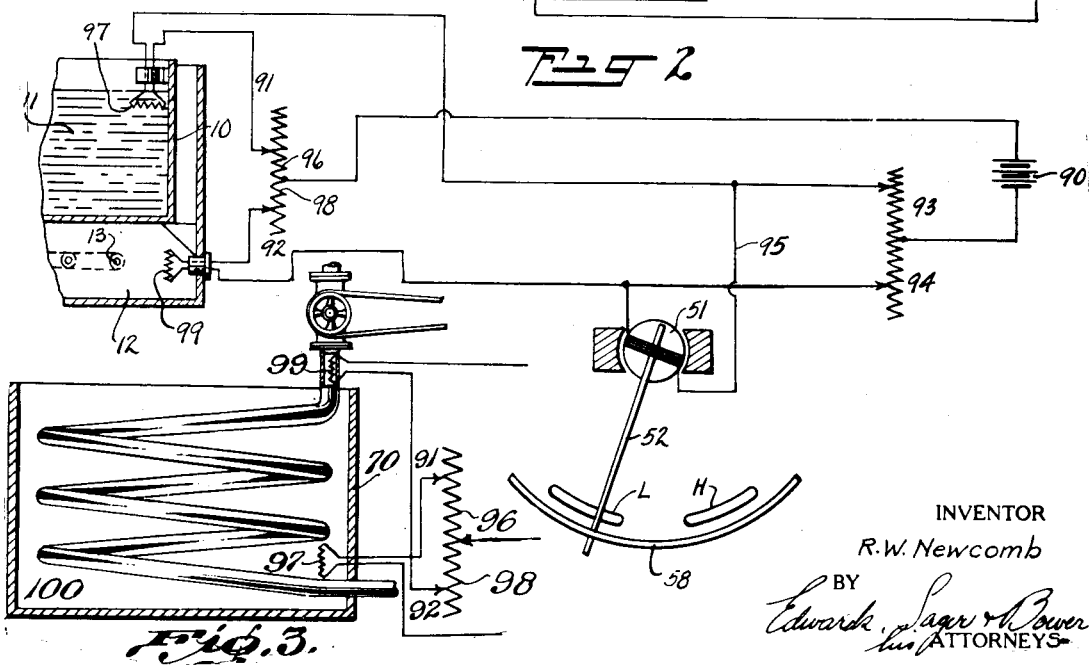
INVENTOR
R. W. Newcomb
BY
Edwards, Sager & Bower
his ATTORNEYS Patented July 9, 1929.

1,720,231

UNITED STATES PATENT OFFICE.

RALPH W. NEWCOMB, OF GREEN VILLAGE, NEW JERSEY, ASSIGNOR TO CHARLES ENGELHARD, INC., A CORPORATION OF NEW JERSEY.

TEMPERATURE-CONTROLLING SYSTEM.

Application filed April 23, 1924. Serial No. 708,492.

This invention relates to heating or cooling devices and particularly to an improved means for maintaining the temperature of material which is being heated or cooled, within desired limits.

While my invention is applicable to a wide variety of uses many of its advantages may be illustrated in connection with the heating of a treating bath as, for example, a bath of molten metal employed for coating wire. In such apparatus the wire is fed through the bath and there receives a coating of metal and suitable heating means such as gas burners located in a combustion chamber beneath the bath are employed to maintain the bath at the required high temperature. The bath is continually losing heat by radiation and by the passage through the bath of the wire and heat is continually supplied to the bath by the burners to take the place of the heat lost. For the purpose of regulating the rate at which the heat is generated by the burners it has been customary to control the burners by a heat responsive device located in the bath. When the temperature of the bath falls too low, the heat responsive device acts to increase the flow of gas to the burners and on the other hand when the temperature of the bath exceeds the desired maximum, the heat responsive device acts to decrease the supply of gas to the burners. It has been found that the use of a regulating device of this character is unsatisfactory for the reason that such device fails to maintain the temperature of the bath within the limits often necessary to proper operation. This is due to the fact that the temperature of the bath does not respond with sufficient quickness to changes in the adjustment of the burners. When the temperature of the bath falls below the minimum desired, as might occur when wire is being fed through the bath at an excessive rate and the regulating means in consequence has acted to increase the supply of gas to the burners the temperature of the bath does not start to rise immediately but often continues to drop to a point considerably below the desired minimum. A considerable quantity of the increased heat generated at the burners is not immediately communicated to the bath but instead is absorbed by the walls of the combustion chamber and neighboring parts. The result is that, although the burners are generating more heat the bath continues for a time to lose heat at a greater rate than it receives heat and the temperature of the bath continues to drop. A similar condition is apt to exist when an attempt is made to reduce the temperature of the bath when it has become too hot. Although the burners are cut down when the temperature of the bath has reached the desired maximum, the bath continues to absorb heat by radiation from the highly heated walls of the combustion chamber and the temperature of the bath continues to rise above the desired maximum. If an attempt is made to adjust the heat responsive device to maintain a substantially constant temperature of the bath, that is, if the device is adjusted so that the temperature at which it increases the supply of gas is very close to the temperature at which it decreases the supply of gas, a condition is apt to result in which the temperature of the bath continuously oscillates between too high a maximum and too low a minimum. When the bath temperature falls below the desired minimum, the supply of gas is increased and this increased supply continues until the bath has attained the temperature at which the heat responsive device cuts down the burners. This increased supply to the burners has continued over a considerable period of time and as a result the walls of the combustion chamber have been raised to an excessively high temperature. These walls continue to radiate heat to the bath at an excessive rate after the burners have been turned down, with a result that the temperature of the bath continues to rise above the desired maximum. When the condition of maximum temperature of the bath has been reached and the burners cut down by the heat responsive device, the walls and neighboring parts of the combustion chamber rapidly cool and by the time the supply of gas is again increased they are in condition to absorb a major part of the heat from the burners and so retard a rise in temperature of the bath. The result is that the bath undergoes a continuous alternate rise and fall of temperature which seriously interferes with the operation of the bath.

One of the important objects of my invention is to avoid the objectionable action above described and to provide a regulating system through which the temperature of the bath may be maintained constant within as narrow limits as desired. To accomplish this I control the bath heating device in response to the temperature of the bath but I modify this control in response to the temperature in the combustion chamber so as to take into account, in adjusting the burners, the effect which the temperature of the combustion chamber will have in changing the temperature of the bath. Thus, when the burners have been adjusted to raise the bath temperature and in consequence the walls of the combustion chamber have become highly heated, I do not ordinarily wait until the temperature of the bath has attained the desired maximum before cutting down the burners, as this would in general lead to an excessive rise in temperature of the bath due to radiation from the highly heated walls of the combustion chamber. Instead I cut down the burners before the bath has reached the desired temperature and rely on this radiation from the walls to bring the temperature of the bath to the desired point. Conversely when the burners have been cut down to lower the bath temperature and the walls have become cool I adjust the burners to restore the heat before the bath has reached the desired low temperature and rely on the losses by radiation or otherwise from the bath to restore its temperature to the desired point.

In accordance with the preferred embodiment of my invention, the maintaining of the burner in any one position of adjustment is made to depend upon the maintenance of a balance between the temperature of the bath and the temperature of the combustion chamber and when this balance is disturbed the burners are adjusted to a new position. The balance may be disturbed by a rise or fall of the bath temperature, the temperature of the combustion chamber remaining the same, in which case the burners will be adjusted to decrease or increase the supply of gas as the case may be. Again the balance may be disturbed by a rise or fall of the temperature in the combustion chamber, the temperature of the bath remaining substantially the same, in which cases the burners will be adjusted to increase or decrease respectively, the flow of gas. A change in the temperature of both bath and combustion chamber may or may not result in disturbing the balance. If the temperature of the bath falls and the temperature of the combustion chamber rises or if the temperature of the bath rises and the temperature of the combustion chamber falls the new temperatures may still balance and in such case there would be no adjustment of the burners. On the other hand should the new temperatures not balance, the burners will be adjusted to increase or decrease the flow of gas depending upon whether the temperature of the combustion chamber is less or greater than that temperature of the combustion chamber which would balance the temperature of the bath.

In the normal operation of the apparatus the temperature of the combustion chamber will be much higher than the temperature of the bath and the temperature of the combustion chamber will vary over a much wider range than the temperature of the bath. When the temperature of the bath and combustion chamber change from one balanced position to another balanced position, the change in temperature of the combustion chamber will be much greater than the change in temperature of the bath.

While I have referred to the apparatus as a treating bath and the heating means as fuel burners, it is obvious that my invention is applicable to other forms of apparatus in which bodies, materials or compartments are maintained at a substantially uniform temperature and in place of the burners any other suitable heating means or heat transferring medium may be employed. Furthermore by a slight modification of the apparatus hereinafter described my invention is applicable to the control of refrigerating systems wherein it is desired to maintain the temperature of a cooled compartment substantially constant.

Other advantages and objects of my invention will appear from the following description taken in connection with the accompanying drawing wherein Fig. 1 represents diagrammatically a heating system embodying one form of my invention, Fig. 2 represents diagrammatically a modification thereof and Fig. 3 is a fragmentary diagrammatic view showing the application of my invention to the control of a refrigerating device.

Referring to Fig. 1, 10 represents a receptacle or compartment adapted to contain material 11 which it is desired to maintain at a constant high temperature. The material 11 may constitute a treating bath. 12 is a combustion chamber provided with burners 13 supplied from a pipe 14 having a valve 15 for regulating the supply of fuel to the burners. The valve 15 is operated by means of a belt 17 from a shaft 18. Secured to the shaft 18 is a gear wheel 19 adapted to be actuated by spring pressed pawls 21 and 22 which are carried by a yoke member 23 pivoted at 24 to a swinging arm 25 pivotally mounted upon the shaft 18. The supporting yoke 23 is normally held in central position in which neither of the pawls 21 and 22 engage with the gear wheel 19 by means of a spring 27 secured at one end to the yoke 23 at a point below its pivot 24 and at its other end to the swinging member 25. The swinging member 25 is adapted to be swung or oscillated about its pivotal support by means of an electric motor 30 to which it is connected by a link 31 operated from a crank 32 on the motor shaft. Motor 30 is operated by current supplied from power mains 9. Mounted upon support 34 secured to the swinging member 25 are two solenoids 35 and 36. Solenoid 35 is connected to the yoke 23 by means of a rod 37 and solenoid 36 is connected to the yoke by means of a rod 38. When either one or the other of the solenoids are energized, their respective rods are moved downwardly and tilt the yoke in one direction or the other, about its pivotal support on the swinging member 25 in such a manner that one of the pawls engages the teeth of the gear wheel 19. In operation the member 25 is continuously oscillated about its pivotal support by means of the motor 30. If neither of the solenoids is energized neither of the pawls 21 and 22 engage with the teeth of the gear wheel 19 and the gear wheel remains stationary. If the solenoid 35 is energized, the yoke is tilted and the pawl 22 engages the gear wheel and as the member 25 is oscillated this pawl serves to rotate the gear 19 in a clockwise direction and through shaft 18, belt 17 operates valve 15 to cut down the supply of fuel to the burners 13. When the solenoid 36 is energized, a reverse action takes place and the valve 15 is operated to increase the supply of fuel to the burners 13.

Operated from the motor 30 by means of a belt 40 is a generator 41 which supplies current at a suitable low voltage to the solenoids 35 and 36 through contacts of a contact making voltmeter 50.

Voltmeter 50 comprises a pivoted armature 51 carrying a needle 52 and positioned beneath the needle 52 and pivotally mounted about the axis of the armature 51 is a segment 53 formed of insulating material. Segment 53 may be moved about its pivotal support and so adjusted to different positions by means of a worm 55 operated by a knob 56. Secured to said segment are two spaced arcuate contacts L and H. Contact L is connected by means of conductor 67 to one terminal of the solenoid 36 and contact H is connected by a conductor 65 to one terminal of the solenoid 35. Mounted above the needle 52 is a conducting arcuate bar 58 pivoted in insulated bearings 59 in the frame of the voltmeter. The bar 58 is formed at one end with oppositely extending arms 60 and 61. The arm 60 is provided with an armature 62 adapted to be attracted by an electromagnet 63 so as to turn said arcuate bar in its bearing. When so turned bar 58 engages the needle 52 and in case the needle 52 is over either the arcuate contacts L or H, forces the needle into engagement with one or the other of these contacts and so completes a circuit from the arcuate contact to the arcuate bar through the needle 52. As actually constructed bar 58 will be positioned directly above the arcuate contacts L and H. The bar 58 is normally biased to its raised or contact breaking position by means of a counterweight 64 on the arm 61. The arcuate bar 58 is connected by conductors 66, 67 to one terminal of the generator 41, the other terminal of the generator being connected to one terminal of each of the solenoids 35 and 36 by conductor 69.

Included in a separate circuit from the generator 41 is the electromagnet 63 and in series therewith a periodic current interrupting device 70. This interrupting device may be of any approved construction and as shown comprises a disk 71 adapted to be rotated in a clockwise direction by a clock or other motor not shown. Disk 71 carries a circular series of pins 72 adapted to engage successively the spring contact 74 to move the same into engagement with contact 75. When a pin has passed out of engagement with the contact 74 this contact springs away from engagement with the contact 75 and in this manner the circuit through the magnet 63 is periodically made and broken.

In operation, when the circuit through the electromagnet 63 is closed, the bar 58 is turned to force the needle 52 downwardly. In case the needle, at the time the circuit is closed to the magnet 63, is above the contact L the needle will be forced into engagement with the contact L and complete a circuit from the generator 41 to the bar 58 through needle 52 to contact L and thence through solenoid 36 to the generator 41. The solenoid 36 operating to tilt the yoke 23 will cause the pawl 21 to engage the gear 19 and as the member 25 is oscillated, the gear 19 will be moved by the pawl 21 to operate the valve 15 to increase the supply of fuel to the burners 13. In case the needle 52 is above the contact H at the time the bar 58 is turned by the magnet 63, a circuit will be completed through the solenoid 35 and the valve 15 will be operated to decrease the supply of fuel to the burners. In case the needle 52 is positioned between the contacts L and H the lowering of the needle will have no effect upon the valve 15.

To prevent sparking at the voltmeter contacts, when the needle is raised, the circuit through the bar 58 may be connected to the interrupter 70 and controlled by the interrupter in such a way that the circuit through the needle will be completed at the interrupter after the needle has been lowered and will be then broken at the interrupter before the needle has been raised.

The position of the needle is controlled in accordance with the temperature in the bath 11 and the temperature in the combustion chamber 12. 80 is a thermo couple positioned in the bath 11 and 81 is a thermo couple positioned in the combustion chamber 12. Similar terminals of the thermo couples are connected together at point 82 and the remaining terminals are connected through a resistance 83 by means of taps 84 and 85 in such a manner that a greater or less resistance may be included in the circuit. From an intermediate point of the resistance 83 a conductor 100 leads to one terminal of the armature 51 of the instrument 50 and the other terminal of the armature is connected by means of a conductor 101 to the point 82. The thermo couples are connected in opposition in the circuit through the resistance 83, that is the thermo couple 80 tends to send current through the resistance 83 in one direction and the thermo couple 81 tends to send current through the resistance 83 in the opposite direction. The thermo couple 81, in normal operation, will be at a considerably higher temperature than the thermo couple 80 and its voltage will be considerably higher than the voltage of the thermo couple 80. The taps to the resistance 83 will normally be positioned so that that portion of the resistance below the intermediate tap will have a considerably higher value than the portion of the resistance above the intermediate tap.

For the purpose of considering the effect which the temperature of the thermo couples 80 and 81 will have on the voltmeter 50 let $V_1$ = voltage of thermo couple 80 and $V_2$ = voltage of thermo couple 81; let $R_x$ represent the resistance of that portion of the resistance 83 above the intermediate tap, plus the resistance of that portion of the circuit from the top of the resistance 83 through thermo couple 80 to the point 82 and $R_y$ represent the resistance of that portion of the resistance 83 below the intermediate tap, plus the resistance of that portion of the circuit from the bottom of the resistance 83 through the thermo couple 81 to the point 82. It will be assumed that the current through the voltmeter 50 is negligible. The voltage applied to the circuit consisting of the thermo couple 80, thermo couple 81 and resistance 83 will be $V_2 - V_1$. The current which flows through this circuit will therefore be $$C = \frac{V_2 - V_1}{R_x + R_y}$$

The voltage between the intermediate tap of the resistance 83 and the point 82 which is the voltage measured by the instrument 50 will be the resistance drop through $R_x$ plus the voltage of thermo couple 80. The voltage drop through resistance $R_x$ will be $$C R_x \text{ or } \frac{V_2 - V_1}{R_x + R_y} \times R_x$$

therefore the voltage between the intermediate tap and the point 82 will be $$V = V_1 + \frac{V_2 - V_1}{R_x + R_y} R_x \quad (1)$$

As a concrete example, let it be assumed that $R_x$ = 1 ohm, $R_y$ = 10 ohms and that when the temperature of the bath and combustion chamber are such as to require no change in the adjustment of the burners, the thermo couple 80 is at such a temperature that its voltage is 10 and the thermo couple 81 is at such a temperature that its voltage is 20. Therefore $V_1$ = 10 and $V_2$ = 20. Substituting these values in equation (1) gives $$V = 10 + \frac{20 - 10}{1 + 10} \times 1 = 10\frac{10}{11}$$

The position of the voltmeter needle will then measure $10\frac{10}{11}$ volts and as it has been assumed that the bath is at the desired temperature and the combustion chamber is at the proper balanced temperature no change in the adjustment of the burners need be made and the needle will then occupy a position above the space between the two arcuate contacts L and H.

Suppose however that the temperature of the bath rises to such an extent that the voltage of thermo couple 80 increases to 11 volts. Assuming that the voltage of the thermo couple 81 remains 20 as before, then $V_1$ = 11, $V_2$ = 20 and $$V = 11 + \frac{20 - 11}{1 + 10} = 11\frac{9}{11}$$

With this voltage across the voltmeter, the needle 52 will be positioned to the right of its former position and lie over the arcuate contact H. Therefore when the magnet 63 is energized and the bar 58 turned, a circuit will be closed through the solenoid 35, the yoke 23 will be tilted in a counterclockwise direction and the oscillations of the member 25 will cause the valve 15 to be operated to decrease the supply of fuel to the burners.

If again it be assumed that the temperature of the bath falls to such an extent that the voltage of thermo couple 80 drops to 9, the temperature of the combustion chamber and therefore the voltage of thermo couple 81 remaining the same, then $V_1$ = 9, $V_2$ = 20 and the voltage across the voltmeter 50 is 10. The needle 52 therefore is positioned to the left of its original central position and lies over the arcuate contact L and the next time the magnet 63 is energized a circuit will be completed through the solenoid 36 which will tilt the yoke 23 in a clockwise direction and increase the supply of fuel to the burners.

Again, assume the voltage of thermo couple 80 remains 10 but the voltage of thermo couple 81 is reduced to 19. By substitution in equation (1) it will be found that the voltmeter will register a voltage of $10\frac{9}{11}$. The needle will therefore be positioned to the left of its central position and will close a circuit through the solenoid 36 to increase the supply of fuel to the burners.

If the voltage of the thermo couple 80 remains at 10 and the voltage of the thermo couple 81 rises to 21, the voltmeter will register a voltage of 11 and the supply of fuel will be reduced.

If however the temperature of the bath falls to a point such that $V_1=9$ and the temperature of the combustion chamber rises to a point such that $V_2=30$, it will be seen, by substituting in equation (1), that the voltage across the voltmeter circuit is $10\frac{10}{11}$ and the needle will occupy its central position between the arcuate contacts L and H and no change will be made in the adjustment of the burners. This means that although the temperature of the bath is below normal that the combustion chamber is so highly heated that without further adjustment of the burners the bath will receive sufficient heat to bring its temperature up to the desired point. The voltage at which the voltmeter will not energize either of the solenoids 35 and 36 may be adjusted by means of the knob 56 which rotates the segment 53 upon which the arcuate contacts L and H are mounted. By spacing the arcuate contacts L and H a greater or less distance from one another the temperature limits of the bath may be varied.

In Fig. 2 I have shown another means for energizing the coil 51 of the instrument 50 which controls the supply of fuel to the burners. This comprises a Wheatstone bridge circuit supplied from a suitable current source 90. The legs of the bridge circuit are indicated by 91, 92, 93 and 94 and the bridging portion of the bridge circuit by 95. The voltmeter or other instrument is connected in the bridging circuit. Legs 93 and 94 may comprise adjustable resistances. Leg 91 comprises a pyrometer resistance 97 which is located in the bath and leg 91 may also comprise an adjustable resistance 96. Leg 92 comprises a pyrometer resistance 99 which is located in the combustion chamber and leg 92 may also comprise an adjustable resistance 98. Resistances 97 and 99 vary in accordance with their temperatures and vary the potential across the bridging circuit in accordance with changes in the difference between the ratios of the resistances of the two legs of each branch of the bridge circuit. The resistance 98 connected in series with the pyrometer resistance 99 will have a greater value than the resistance 96.

In applying the embodiment of my invention shown in Fig. 2 to the control of a refrigerating device the resistance 97 will be located in the compartment to be cooled as shown at 100 in Fig. 3 and the resistance 99 will be located so as to measure the temperature of the cooling medium such as brine. The contacts controlled by the needle of the voltmeter 50 will be so arranged that if the temperature of the resistance 99 is less than the temperature at which such resistance would balance the temperature of the resistance 97 the flow of cooling medium through the system will be diminished and in case the temperature of the resistance 99 rises above the balanced temperature the flow of cooling medium will be increased. Instead of increasing or diminishing the flow of cooling medium it is obvious that the control from the voltmeter needle may regulate the operation of the refrigerating machine itself, so as to withdraw heat at a greater or less rate from the cooling brine.

In place of employing resistances of different values in the thermo couple or pyrometer circuits I may employ a heat responsive device in the bath, which is much more susceptible to changes in temperature than the heat responsive device in the combustion chamber.

I claim:

1. Apparatus for regulating the temperature of a bath which is heated by a fuel burner contained in a combustion chamber, said apparatus comprising an electrical circuit containing resistance, means varying the voltage in one portion of the circuit in accordance with changes in the temperature of the bath, means varying the voltage in an adjacent portion of the circuit in accordance with changes in the quantity of heat in the combustion chamber and means regulating the supply of fuel to said burner in accordance with the voltage between a point in said circuit between said portions and intermediate point of said resistance.

2. Apparatus for regulating the temperature of a bath which is provided with a heating means, said apparatus comprising an electrical circuit containing resistance, means varying the voltage in one portion of the circuit in accordance with changes in the temperature of the bath, means varying the voltage in an adjacent portion of the circuit in accordance with changes in temperature in the neighborhood of said heating means, and means controlling said heating means in accordance with the voltage between a point in said circuit between said portions and an intermediate point of said resistance.

3. The combination with a bath, a heating chamber and a burner therein, of a thermo couple in said bath, a thermo couple in said chamber, a resistance connected between similar poles of said thermo couples, an electrical connection between the two remaining poles of said thermo couples, a voltmeter connected between said connection and an intermediate point of said resistance, said point dividing said resistance such that the resistance from the point to that end of the resistance which is connected to the bath thermo couple is less than the resistance from the said point to that end of the resistance which is connected with the heating chamber thermo couple and means controlled by said voltmeter for decreasing the supply of fuel to said burner on increase in voltage across the voltmeter, above a predetermined value and increasing the supply of fuel on decrease of voltage across said voltmeter below a predetermined value.

4. The combination with a bath, means for heating the same, a thermo-couple responsive to changes in the temperature of said bath, a thermo-couple responsive to changes in the temperature of said heating means, a resistance connected between similar poles of said thermo-couples, an electric connection between the two remaining poles of said thermo-couples, a voltmeter connected between said connection and an intermediate point of said resistance, and means controlled by said voltmeter for decreasing the rate at which heat is generated by said heating means on the increase in voltage across said voltmeter, above a predetermined value and increasing the rate at which heat is generated on decrease of voltage across said voltmeter, below a predetermined value.

5. The combination with a bath, a heating chamber and a burner therein, of a thermo couple in said bath, a thermo couple in said chamber, a resistance connected between similar poles of said thermo couples, an electrical connection between the two remaining poles of said thermo couples, a voltmeter connected between said connection and an intermediate point of said resistance, said point dividing said resistance such that the resistance from said point to the end of said resistance which is connected to the bath thermo couple is less than the resistance from the said point to the end which is connected with the heating chamber thermo couple, means controlled by said voltmeter for decreasing the supply of fuel to said burner on predetermined increase in voltage across the voltmeter, above a predetermined voltage, and increasing the supply of fuel on predetermined decrease of voltage across said voltmeter below said predetermined voltage and means for varying said predetermined voltage.

6. Apparatus for regulating the temperature of a receptacle which is heated by means contained in a heating chamber, said apparatus comprising an electrical circuit containing resistance, means varying the voltage in one portion of the circuit in accordance with changes in temperature in said receptacle, means varying the voltage in an adjacent portion of the circuit in accordance with changes in temperature in said chamber and means regulating said heating means in accordance with the voltage between a point in said circuit between said portions and an intermediate point of said resistance.

7. The combination with a receptacle adapted to contain material to be heated, a heating chamber and heater therein, a thermo-couple in said chamber, a thermo couple in said receptacle, a resistance connected between similar poles of said thermo couples, an electrical connection between the two remaining poles of said thermo couples, a voltmeter connected between said connection and an intermediate point of said resistance, and means controlled by said voltmeter for decreasing the rate at which heat is generated by said heater on increase in voltage across said voltmeter above a predetermined value and increasing the rate at which heat is generated by said heater on decrease in voltage across said voltmeter below a predetermined value.

8. The combination with a bath, means for heating the bath, a thermo-couple responsive to changes in the temperature of said bath, a thermo-couple responsive to changes in the temperature of the heating means, a resistance connected between similar poles of said thermo-couples, an electric connection between the two remaining poles of said thermo-couples, a current responsive device connected between said connection and an intermediate point of said resistance, and means controlled by said current responsive device for varying the rate at which heat is generated by said heating means.

RALPH W. NEWCOMB.